Figure 1:
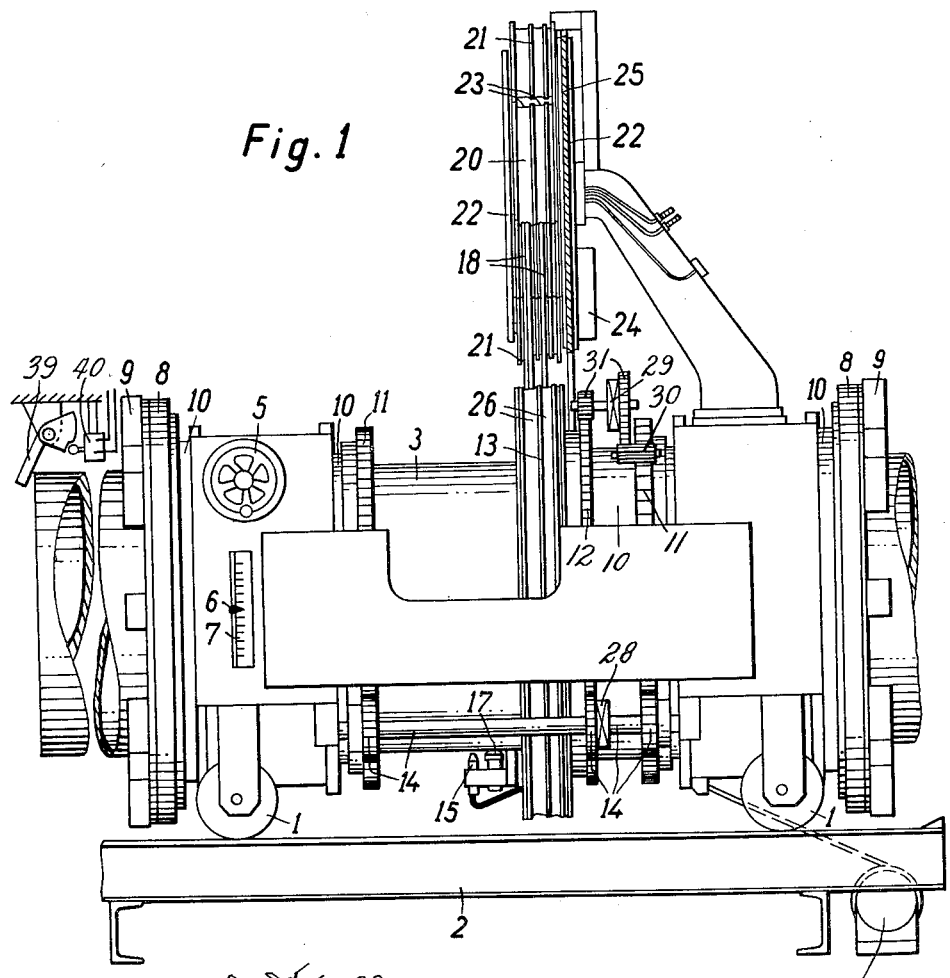

July 10, 1962

R. DIENER 3,043,576

PIPE CUTTING MACHINE FOR AUTOMATICALLY DIVIDING
A ROTATING AND AT THE SAME
TIME AXIALLY MOVING PIPE

Filed Feb. 26, 1959

2 Sheets-Sheet 1

Inventor:
R. Diener

Inventor:
R. Diener

United States Patent Office 3,043,576
Patented July 10, 1962

3,043,576
PIPE CUTTING MACHINE FOR AUTOMATICALLY DIVIDING A ROTATING AND AT THE SAME TIME AXIALLY MOVING PIPE
Richard Diener, Berlin-Hermsdorf, Germany, assignor to Berliner Maschinenbau A.G. vormals L. Schwartzkopff, Berlin, Germany
Filed Feb. 26, 1959, Ser. No. 795,704
Claims priority, application Germany Feb. 27, 1958
6 Claims. (Cl. 266—23)

This invention relates to machines for automatically dividing a rotating and at the same time axially moving pipe, more particularly for dividing a pipe with a helical seam while the pipe is being manufactured, which machines are moved at the axial speed of the pipe during the cutting process and after the cut has been completed return automatically to the starting position for the next cut.

Many kinds of these machines are known which are designed to cut a merely axially moving pipe during its manufacture. In order to participate in the axial movement of the pipe during the cutting process, these machines either are formed as trucks rolling on rails, or are displaceable on slideways. The pipe which is to be divided usually passes through the machine, which is provided with a kind of jaw chuck which clamps the pipe fast at the point where the pipe is to be cut through, and the machine is taken along by the pipe in an axial direction until the cut has been made. After this, the machine releases the pipe and returns automatically to the starting position. The cutting action of these machines is usually performed by means of a plurality of cutting torches which are arranged on the cutting line uniformly in a circle round the pipe, so that the pipe is cut and parted by a short circular movement of the cutting torches round the pipe, which movement corresponds to the interval between two cutting torches. The use of a plurality of cutting torches on one cutting line has the disadvantage that a uniform cut is never obtained.

Also, for dividing pipes which do not move axially and do not rotate, machines are known which are provided with only one cutting torch which cuts through the pipe in a rotary movement round the pipe.

For pipes which are made by helically winding a metal strip and which therefore rotate and at the same time move axially during manufacture, there are no known machines which are adapted to divide the pipe during manufacture and which fulfil all requirements. In the known machines, circular saws are used for this kind of cutting; the saws participate in the axial movement of the pipe and cut the pipe off by making use of its circular movement.

A machine which divides the pipe by means of a cutting torch—for many technical reasons, this is more advantageous than mechanical dividing—and which, moreover, makes the cut by means of only one cutting torch, is not known at the present time. The difficulties lie in the length of the process of cutting with a torch, and in the rotation of the pipe.

These difficulties are overcome by the present invention, according to which two rotatable jaw chucks are arranged one at each end of the machine, and during the cutting operation, the machine is connected firmly by these chucks to the pipe to be divided, whereby the chucks are rotated and during the cutting operation a rotary movement around the pipe is imparted by the chucks, in accordance with the speed of rotation of the pipe, to a cutting torch to which the chucks are connected through the intermediary of a transmission, and suitable means for guiding flexible gas tubes permit two revolutions of the cutting torch in the machine.

The jaw chucks may be equipped with any suitable known motor-driven actuating apparatus for the jaws. The transmission of the rotary movement from the jaw chucks to the cutting torch is made such that at the beginning of the cutting operation the cutting torch is driven at the same speed as that of the pipe, until a start for the cut has been burnt through, whereupon a speed reducing mechanism is brought into operation so that the speed of rotation of the cutting torch lags behind that of the pipe, in accordance with the cutting speed. The winding-up of the flexible gas tubes is made such that from the point where the flexible tubes are taken directly to the cutting torch, the torch can make one revolution in a direction opposite to that of the rotation of the pipe, and one revolution in the direction of rotation of the pipe, and the tubes can lay themselves in one turn on a ring carrying the cutting torch. This permits the cutting torch to make two revolutions in the machine, from the position "one revolution opposite to the direction of revolution of the pipe," through the point where the tubes are taken directly to the torch, to "one revolution in the direction of rotation of the pipe." In order to enable the pipe cutting machine to be upwardly and downwardly adjusted when pipes of different diameters are made by one pipe-making machine, the cutting machine is upwardly and downwardly displaceable on its wheels. The return of the machine to the starting point after the cut has been completed is effected by means of an electrical cable winch.

Figure 2:
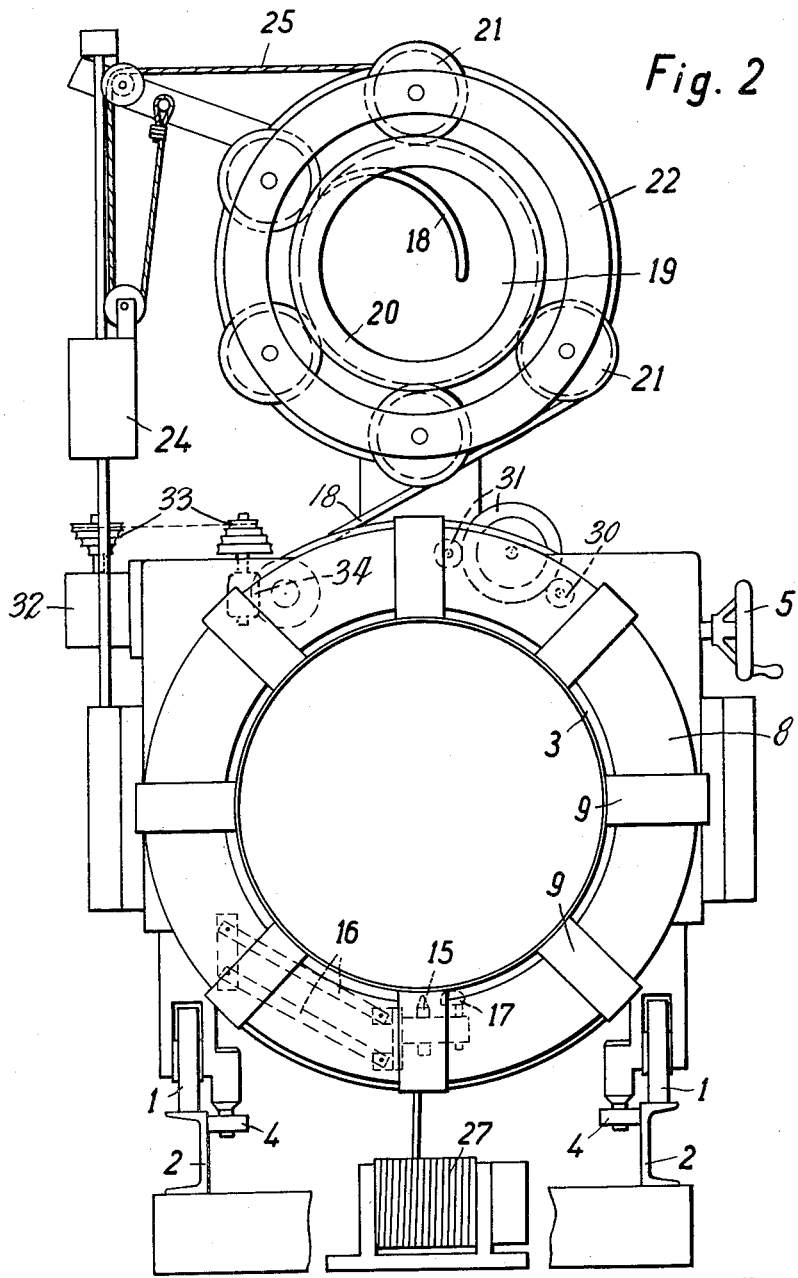

An embodiment, chosen by way of example, of a pipe-cutting machine constructed in accordance with the present invention is particularly described hereinafter with reference to the accompanying drawings, in which:

FIGURE 1 is a side view of the pipe cutting machine,
FIGURE 2 is a view of the pipe cutting machine, seen in the direction of the axis of the pipe to be cut, and
FIGURE 3 is a fragmentary diagrammatic view illustrating chuck jaw actuating means.

The pipe cutting machine is so formed as to be capable of travelling a short distance, on wheels 1 running on rails 2, along the pipe 3 passing through the machine. For guiding the machine on the rails 2, in the embodiment illustrated rollers 4 are provided which run on the rails laterally. To enable the machine to be adjusted in height in accordance with the pipe being produced, the wheels 1 are adapted to be moved outwards from the machine by means of a hand wheel 5, and the height to which the machine has been adjusted is shown on a scale 7 by means of an indicator 6. A respective jaw chuck 8 is freely rotatably mounted at each end of the machine. The jaws 9 of the jaw chucks 8 can be actuated by motor in any suitable known manner. In the present embodiment they are actuated by means of an electric motor. Thus, the jaws 9 shown diagrammatically in FIGURE 2 include axially movable clamping heads carried by threaded spindles 37. The inner end of each spindle carries a gear 37′ in mesh with a gear ring 36. An electric motor 35 drives a gear 35′ to impart rotary movement to gear ring 36 which in turn imparts axial movement inwards to the spindles 37. A slip ring means 38 furnishes current to the motor 35. Each of the jaw chucks 8 is mounted at one end of a respective rotatably mounted sleeve 10 provided with a toothed rim 11 at its other end. A ring 13 provided with a toothed rim 12 is rotatably mounted on an extension of one of the sleeves 10. Connecting means for transmitting the rotary movement of the jaw chucks to the ring are provided between the jaw chucks 8 and the ring 13. The connection between the jaw chucks 8 and the ring 13 is such that by means of magnetic couplings either a direct connection between jaw chucks and ring 13 is established by direct connection of the ring 13 to the sleeve 10 on which the ring is mounted, or a speed-reducing connection from the jaw chucks to the ring is brought into operation. The direct connection, that is, a drive which rotates the ring 13 at the same speed as sleeves 10 is effected through energization of the magnetic coupling 28, shown diagrammatically, which couples the ring 13 to the sleeves 10 through the intermediary of the toothed rim 11, a toothed wheel intermediate shaft 14 and the toothed rim 12. A speed reducing connection for transmitting drive between the jaw chucks and the ring includes reduction gearing components 30, 31 establishing a driving connection between gear or toothed rim 11 and gear or toothed rim 12 when magnetic coupling 29 is energized following de-energization of magnetic coupling 28. The ring 13 carries a cutting torch 15 supported by two arms 16 in such a manner as to be movable radially with respect to the centre of the pipe. By means of a feeler 17 bearing against the surface of the pipe 3 the distance of the cutting torch 15 from the surface of the pipe is kept constant; a spring means, not shown, urges the cutting torch and its feeder 17 towards the surface of the pipe. The ratio of the transmission from the toothed rims 11 to the ring 13 by way of the speed reducing gearing components 30, 31 and toothed rim 12 when coupling 29 is energized is made such that the ring 13 makes only about two revolutions during about three revolutions of the jaw chucks 8, and accordingly the cutting torch 15 makes one revolution round the pipe during about three revolutions of the pipe. In order to permit two revolutions of the ring 13 and two revolutions of the cutting torch 15 in the machine to take place without entangling the flexible gas tubes 18, a winding up device 19 is provided for the flexible gas tubes 18. The winding-up device 19 comprises a sleeve 20 round which five rollers 21 are distributed and are so held, by means of two rings 22, as to be capable of rolling round the sleeve. The sleeve 20 and rollers 21 are provided with peripheral grooves 23 in which the flexible gas tubes 18 can be accommodated. As shown in FIGURE 2, the flexible gas tubes 18 are taken out from the centre of the sleeve 20 through bores into the grooves 23 of the sleeve, laid round the sleeve 20 and taken outwards over one of the rollers 21. As shown for instance in the embodiment illustrated, the rollers 21 are stressed in one direction of rotation about the sleeve 20 by means of a weight 24 and cable 25, whereby the rollers also resiliently stress or wind up the flexible gas tubes 18 round the sleeve 20. In this way, the ring 13 to which the flexible gas tubes 18 for feeding the cutting torch 15 are attached at one point, can make one revolution to the right and one revolution to the left from this point, and during this movement the gas tubes 18 will lay themselves in grooves 26 round the ring 13. Therefore, the ring 13 can make two revolutions without entangling or overstressing the flexible gas tubes 18. The gas tubes 18 while being wound on to or off the ring 13 are kept continuously under slight resilient stress by the winding-up device 19. An electric motor driven cable winch 27 is provided for moving the machine along the rails 2 to the starting point from which the machine is displaced by the pipe 3 during the cutting operation.

To enable the invention to be better understood, the operation of the pipe cutting machine is briefly described hereunder.

The pipe 3, which rotates and at the same time moves axially during manufacture, passes through the machine and through the jaw chucks 8. A switch means 40 tripped by lever means 39 being moved by the end of the pipe 3 and which switch means and lever means are of a type already known and whose position is adjustable to a particular length of the pipe that is being produced, sets the machine in operation when the required length of pipe is reached. When the machine comes into operation, the jaw chucks 8 grip the pipe 3 firmly. The jaw chucks are rotated by the rotating pipe, and the machine is driven by the axial movement of the pipe and rolls along the rails 2. Direct connection between the jaw chucks 8 and the ring 13 and cutting torch 15 is established automatically when magnetic coupling 28 is energized, coupling 29 being de-energized. The cutting torch 15 thus rotates at the same speed of rotation as the pipe 3 until the torch has burnt through the pipe and thus made a beginning for the cut. After a certain time, which is required for burning through the pipe to make the beginning of the cut, the direct connection between the jaw chucks 8 and the ring 13 is automatically interrupted that is, coupling 28 is de-energized and magnetic coupling 29 is energized so that by way of the reduction gearing components 30, 31 the ring 13 is driven at a reduced speed; the difference corresponds to the cutting speed. Before the beginning of the cutting process the cutting torch 15 has been previously rotated, from the point where the flexible gas tubes 18 depart directly from the ring 13, through one revolution oppositely to the direction of rotation of the pipe 3, and is held in this position for the beginning of the cutting process. Thus, during the cutting process the cutting torch 15 can make two revolutions in the machine, and one revolution relatively to the pipe 3 which at the same time makes about three revolutions in the machine, whereby a full circular cut is made round the pipe. After the cut has been made, the jaw chucks 8 release the pipe 3 and the machine is pulled back along the rails 2 to the starting position by the winch 27; at the same time a motor including electric motor 32, step pulley discs 33, and drive belt means connecting the same and gearing 34 coupled to toothed rim 12, with both magnetic couplings de-energized drives ring 13 and thereby rotates the cutting torch through two revolutions back into the starting position, and the machine is ready for the next cut.

All the actions of the pipe cutting machine constructed in accordance with the invention, from the moment when the machine is set in operation by the switch adjustable to pipe length, to the return to the starting position or position of readiness for the next cutting operation, takes place completely automatically. This automatic sequence of the actions of the machine is produced by an arrangement of limit switches and relays, a kind of chain reaction.

I claim:

1. In a machine for transversely severing an axially moving and rotating shape, the combination including a wheeled frame, gripping means carried by the frame, surrounding the path of movement of the shape and adapted to grip the same so that the axial movement of the shape moves the frame therewith, said gripping means including a rotatably mounted component that rotates with and at the same speed as the shape, a ring means journalled for rotation relative to said rotatably mounted component; a cutting torch means carried by the ring means, flexible conduit means connected to said cutting torch means for leading fuel thereto, windup means carried by the frame and over which said conduit means are layed, drive imparting means operatively engageable between the rotatable component of the gripping means and the ring and adapted to impart a rotary drive to the ring responsive to the rotation of the shape but at a reduced speed ratio compared with the speed of rotation of the shape and gripping means, and said windup means including a rotatable component operative to accommodate the difference in the speed of rotation between the ring and the shape whereby the shape can be severed due to the rotary movement of the cutting torch means without entangling the flexible conduit means.

2. In a machine for transversely severing an axially moving rotating shape, a mobile frame having a longitudinally extending passageway therethrough to accommodate a shape to be severed, annular chuck means carried by said frame and operable to engage a moving shape to transmit axial movement from the shape to the frame, a ring rotatably carried by the frame for axial movement therewith, cutting torch means carried by the ring and operable to sever the shape in response to relative rotation between the shape and ring, means for coupling the ring to the chuck means for driving the ring in response to rotation of the shape but at a speed different from that of the shape, flexible tube means for conveying gas to the cutting torch means and tube winding means including the periphery of the ring for receiving said tube means and accommodating the differential relative movement between said shape and said ring without entangling said tube means.

3. A machine as claimed in claim 2, in which said tube winding means includes a sleeve having an opening in the periphery, said tube means passing from the interior of the sleeve through said opening and being layed about at least a part of the periphery of the sleeve, a rotatable frame mounted coaxially of said sleeve, rollers carried by said frame and having their axes parallel to the axis of the sleeve, said tube means being guided over and by at least some of said rollers and passing over part of the periphery of said ring and connected to said torch means, and tensioning means connected to said rotatable frame to normally urge the same and the rollers carried thereby to turn in one direction, thereby placing said tube means in tension thus permitting the ring to perform the necessary relative rotations with respect to the shape without entangling the tube means.

4. A machine as claimed in claim 2 and further including windup means connected to said frame and operative after a shape severing operation and a release of the chuck means from the shape to return the frame to its starting position.

5. A machine as claimed in claim 2 including means for releasably directly connecting the ring to the chuck means for rotation with the shape at the speed of rotation of the shape for a period of time sufficient for the torch means to initiate a cut and the means for coupling the ring to the chuck means includes a speed reducing transmission releasably operably connected between the chuck means and the ring and likewise responsive to the rotation of the shape for thereafter rotating the ring relative to the shape so that torch means performs one relative rotation about the shape to sever the same.

6. A machine as claimed in claim 3 in which said sleeve and said rotatable frame are mounted above said ring and have their axes lying in the same vertical plane as that containing the axes of the shape and ring.

References Cited in the file of this patent
UNITED STATES PATENTS

| | | |
|---|---|---|
| 1,780,009 | Fantz | Oct. 28, 1930 |
| 1,861,923 | Jones et al. | June 7, 1932 |
| 1,872,114 | Burnish | Aug. 16, 1932 |
| 1,912,362 | Coberly | June 6, 1933 |
| 1,930,295 | Von Henke | Oct. 10, 1933 |
| 2,063,498 | Glick | Dec. 8, 1936 |
| 2,221,788 | Doyle | Nov. 19, 1940 |
| 2,417,412 | Herbst | Mar. 18, 1947 |
| 2,495,360 | Young | Jan. 24, 1950 |
| 2,847,204 | Menser et al. | Aug. 12, 1958 |

FOREIGN PATENTS

| | | |
|---|---|---|
| 882,947 | Germany | July 13, 1953 |